April 21, 1925.

L. B. HALLMAN

MACHINE FOR DESTROYING BOLL WEEVILS

Filed Oct. 8, 1923

Inventor
Ludlow B. Hallman,
Watson, Coit,
Moore & Grindle
Attorney

Patented Apr. 21, 1925.

1,534,947

UNITED STATES PATENT OFFICE.

LUDLOW B. HALLMAN, OF DOTHAN, ALABAMA.

MACHINE FOR DESTROYING BOLL WEEVILS.

Application filed October 8, 1923. Serial No. 667,390.

*To all whom it may concern:*

Be it known that I, LUDLOW B. HALLMAN, a citizen of the United States, and residing at Dothan, county of Houston, State of Alabama, have invented certain new and useful Improvements in Machines for Destroying Boll Weevils, of which the following is a specification.

This invention relates to spraying apparatus and more particularly to portable apparatus adapted to spray vegetation with a liquid solution containing poisonous substances which will destroy plant insect life.

One of the objects of the present invention is to provide a light, simple and practical construction of spraying machines designed to effectively distribute a poisonous solution over several rows of plants.

Another object of the invention is to provide a tank for holding a solution, the tank being supplied with compressed air from a compressor actuated by the wheels of a vehicle on which the tank is carried, and an improved arrangement of conduits connecting the tank with the spraying nozzles.

Other objects and advantages will be apparent from the detailed description taken in connection with the drawings which disclose a preferred embodiment of the invention and in which.

Figure 1:
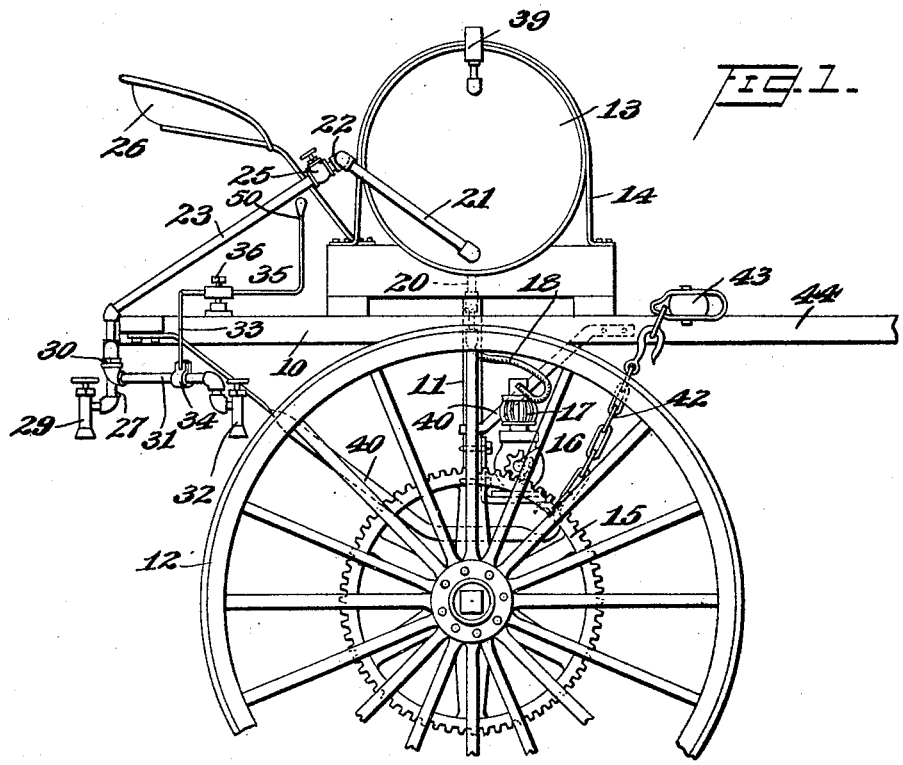
Fig. 1 is a side elevation of the spraying machine in its preferred form.
Figure 2:
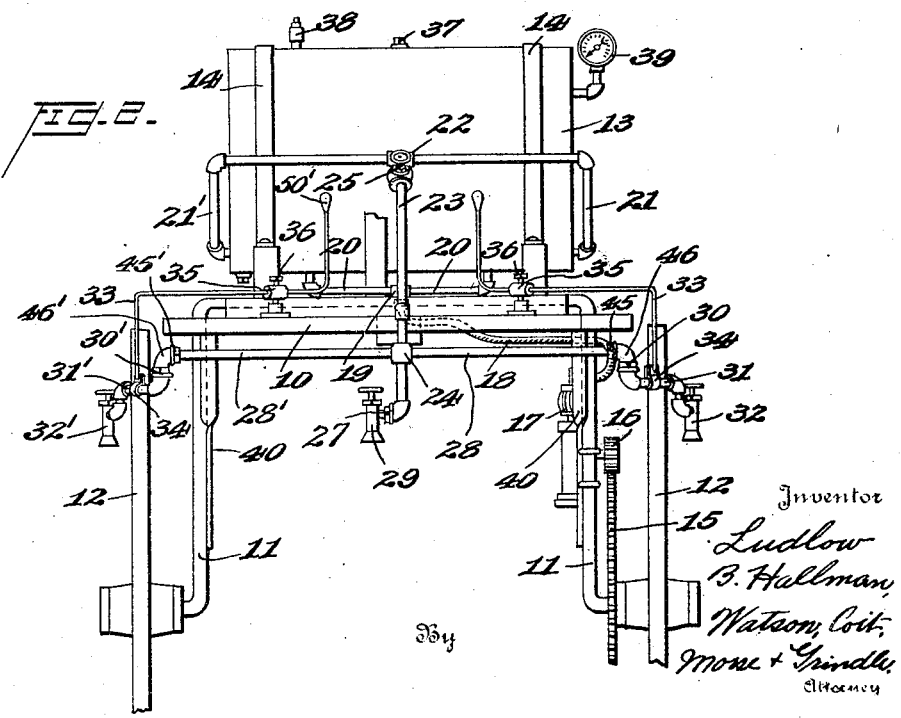
Fig. 2 is a rear elevation.

Referring to the drawings, a wheeled frame 10, supported by a drop axle 11 and wheels 12, carries a reservoir or tank 13 containing a spraying solution. The reservoir is secured to the frame 10 by means of suitable fastening straps 14. Rigidly connected to the hub of one of the wheels 12 is a relatively large gear 15 which meshes with a small pinion 16 forming part of the driving mechanism of an air compressor 17 which is bolted to one of the depending arms of the drop-axle. Motion of the vehicle in either direction will operate the compressor. A suitable hose or pipe 18 connects the discharge port of the air compressor to a T-coupling 19, from which the compressed air flows through the branch pipes 20 into the reservoir 13 at points some distance apart. Two branch pipes are shown but it is understood that the air may enter at three or more points along the bottom of the reservoir. The spraying solution may be any one of the well known preparations for destroying boll-weevils and other plant insects. Unless these solutions are thoroughly agitated the heavier substances will settle to the bottom of the tank. The reservoir 13 is preferably cylindrical in form and the branch pipes 20 enter the tank directly below the axis so that the incoming air enters at the lowest point in the tank. The compressed air entering at two or more widely spaced points will thoroughly agitate the solution and prevent settling of solid matter in the bottom of the tank.

The air forced into the reservoir, being under pressure, acts as a piston on the surface of the spraying solution contained in the tank. The solution is forced out of the tank 13 through the outlet pipes 21, 21′, to a T-coupling 22. A single pipe 23 connects the T-coupling 22 with coupling 24. A globe valve 25 in the pipe 23 is situated near the operator's seat 26 and permits regulation of the quantity of solution passing out of the reservoir. To coupling 24 are connected the swiveled joint 27 and branch pipes 28, 28′. To the joint 27 is connected a central spray nozzle 29 which depends from the frame at a point approximately midway between the wheels of the vehicle. At the ends of the pipes 28, 28′, which extend beyond each side of the vehicle frame, are swiveled joints 45, 45′. Elbows 46, 46′ make a right angle connection between the swiveled joints 45, 45′ and swiveled joints 30, 30′ to which are connected branch pipes 31, 31′ having at their ends spray nozzles 32, 32′. With this construction the nozzles 32, 32′ can be swung either in a vertical plane about the joints 45, 45′ or in a horizontal plane about the joints 30, 30′. It is thus possible for the operator to elevate or depress and swing inwardly or outwardly the spray nozzles 32, 32′. The outlet pipes 21, 21′ are inclined toward the tank in order that any sediment collecting in the pipes will flow back into the reservoir. This will prevent pockets of solid matter from coming in the conduits while the machine is standing.

An angularly bent rod 33 is provided at one end with a handle 50 and is secured at the other end to a strap 34 fastened to the branch 31. The horizontal portion of the rod 33 is circular in cross section and is adapted to slide or rotate in a pivoted guide 35 which is secured to the frame 10. A set screw 36 is provided for clamping the rod in the guide. The rod and guide are conveniently situated near the operator's seat 26 so that by sliding the rod through the guide the branch pipe 31 and nozzle 32 may be swung in an arc. When the operator wishes to elevate or depress the nozzle the handle 50 is turned in the proper direction to raise or lower the branch pipe 31. A similar arrangement is provided on the opposite side of the machine for manipulating the branch pipe 31' and nozzle 32'. It is thus possible to spray three rows of varied widths and heights by adjusting the distances between the nozzles to conform with the distances between the rows of plants and setting them at the proper elevation.

The reservoir is filled through the opening 37 in the top of the tank. A filler plug closes this opening while the machine is in operation. A safety valve 38 and air gauge 39 are provided for regulating the air and enabling the operator to ascertain what pressure is in the tank.

Braces 40, and chain 42 connect the axle with the frame to lessen shocks occasioned by violent contacts with obstacles in the field. A double tree 43 is attached to the tongue 44 for the purpose of attaching draft animals to the machine.

With the described arrangement of portable reservoir and air compressor geared to the vehicle wheels it will be apparent that the machine possesses a wide range of adaptability to different conditions in spraying vegetation, particularly cotton plants. The spray nozzles can be readily adjusted to conform with the distances between rows and heights of plants and the spray so directed that the solution is sprayed directly over the plants. The tank containing the solution, the compressor and gearing are mounted on a vehicle in such a manner that there is no danger of the parts of the machinery destroying the plants by coming in contact with them. The conduits connecting the tank with the spray nozzles are conveniently arranged so that the solid matter in the solution does not tend to form into cakes in the piping and the flow of the solution is at all times within the control of the operator.

Having thus described the invention, what is claimed as new and desired to be secured by Letters Patent is:

In a portable spraying machine, in combination, a vehicle frame, a liquid reservoir secured to the frame, a seat on said frame, a distributor pipe connected to the reservoir, branch pipes at the ends of said distributor pipe, a pair of swiveled connections between each branch pipe and the distributor pipe, levers connected to the branch pipes for swinging said branch pipes in horizontal and vertical directions, said levers having upwardly bent portions extending to points adjacent the seat.

In testimony whereof I hereunto affix my signature.

LUDLOW B. HALLMAN.